United States Patent [19]

Merrow et al.

[11] 3,762,453
[45] Oct. 2, 1973

[54] HAND TOOL HANDLE

[75] Inventors: George W. Merrow, Bloomfield; Robert F. West, West Simsbury, both of Conn.; Carl E. Eliason, Warwick, R.I.; Joseph J. Guarnaccia, Wethersfield, Conn.

[73] Assignee: The Stanley Works, New Britain, Conn.

[22] Filed: May 12, 1971

[21] Appl. No.: 142,625

[52] U.S. Cl. ............ 145/61 C, 145/61 J, 145/61 M
[51] Int. Cl. .............................................. B25g 1/10
[58] Field of Search ............. 145/29 R, 29 A, 29 B, 145/36, 61 R, 61 A, 61 B, 61 C, 61 E, 61 J, 61 K, 61 M

[56] References Cited
UNITED STATES PATENTS 2,960,133  11/1960  Shepherd .......................... 145/61 R
3,578,825  5/1971  Merrow ............................. 145/29 R Primary Examiner—Othell M. Simpson
Assistant Examiner—Mark S. Bicks
Attorney—Prutzman, Hayes, Kalb & Chilton

[57] ABSTRACT

A tubular handle for hand tools and the like comprises a grip supporting portion having a hollow open construction at the butt end thereof and a solid preformed plastic plug of material exhibiting dimensional stability at elevated temperatures secured in the open end by a firm pressure fit therewith. A hand cushion grip is molded directly onto the handle and securely conforms to the grip supporting portion and plastic plug, fully encasing both members. The sealed mold utilized in molding the grip contains a multiplicity of perforation-producing pins having individual gas vents associated therewith, the pins and vents being spaced along the longitudinal extent of the mold cavity.

6 Claims, 5 Drawing Figures

PATENTED OCT 2 1973 3,762,453
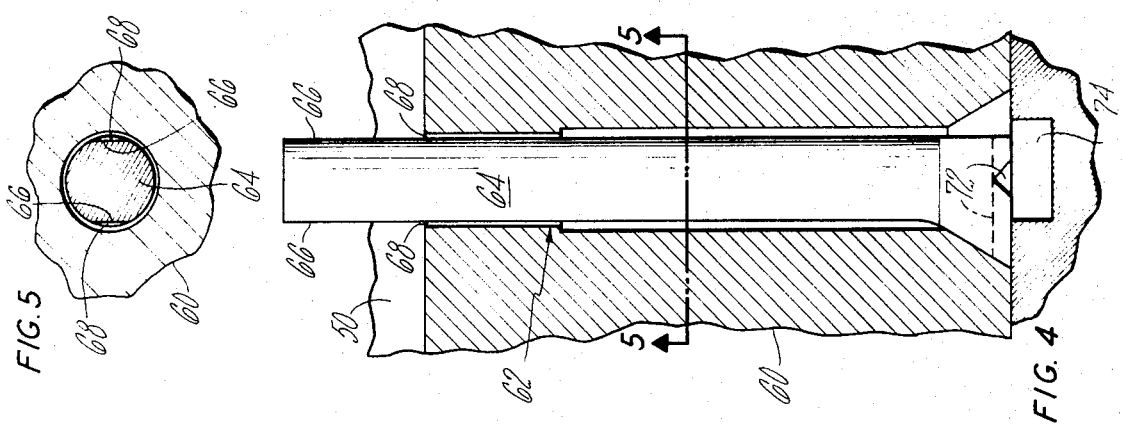
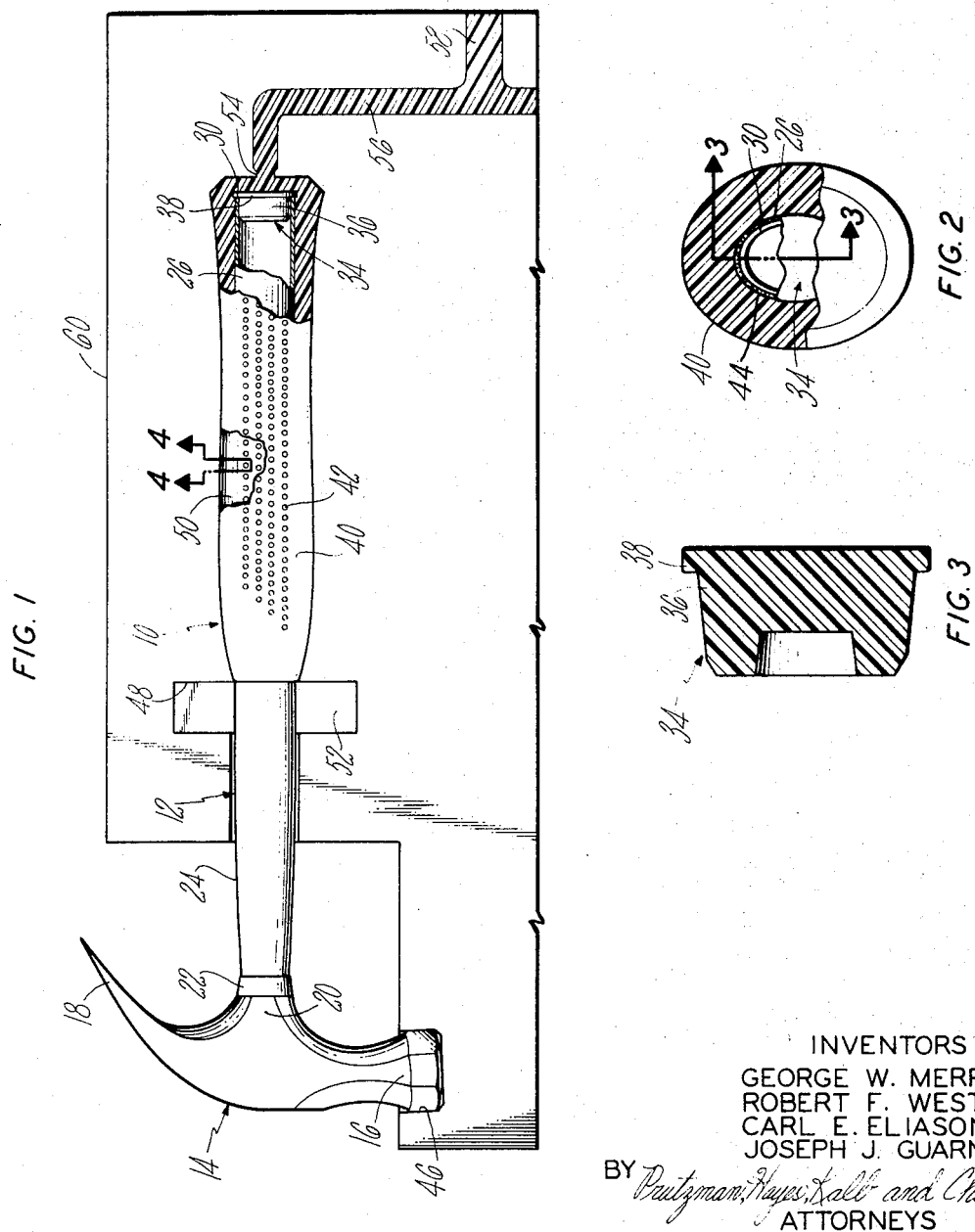
INVENTORS
GEORGE W. MERROW
ROBERT F. WEST
CARL E. ELIASON
JOSEPH J. GUARNACCIA
BY Dautzman, Hayes, Kalb and Chilton
ATTORNEYS

HAND TOOL HANDLE

BACKGROUND AND SUMMARY OF THE INVENTION

The present invention relates generally to hand tool handles and is particularly concerned with both a new and improved tool handle having a resilient grip molded thereon and a new and improved method of fabricating such a tool handle.

Heretofore, hand tools such as hammers, axes and the like generally have utilized preformed rubber grips on both solid and tubular type handles. The preformed shock-absorbing grips were usually formed of a suitable elastomeric material such as rubber or the like and could be slipped over the butt end of the handle and firmly secured to provide the requisite covering of good shock-absorbing quality. Although such a construction has provided acceptable performance characteristics, the industry has long sought ways to improve the method of fabricating these handles while reducing the manufacturing costs. Working toward that end, attempts have been made to mold the grip directly onto the tool handle. However, molding of grips directly on tubular handles has heretofore proved unsatisfactory since the fluid molding composition enters the hollow butt end of the handle and the heat associated with the molding operation causes a substantial pressure increase in the air entrapped within the handle. Accordingly, before the grip could fully set and harden, the increased pressure build-up within the tubular handle acted against the butt end of the grip and caused it to grossly distort and even rupture. Attempts to use plugs made of plastic and the like to close the butt end of the tubular handle generally have been found unsuccessful due to the inability of such plug material to maintain its dimensional stability at the elevated molding temperatures employed and firmly adhere to the tubular handle under the pressure loads developed.

Additionally it has been found that as the fluid molding composition is injected into the cavity, the air outside the handle yet within the mold cavity is frequently entrapped by the molding composition unless enlarged mold vents are provided along the mold parting line. Unfortunately, when such vents are provided, the molded grip necessarily includes an excessive and unsightly flash or rib of material at the parting line, thereby requiring an additional manufacturing operation in order to effect its removal.

Accordingly, it is an object of the present invention to provide a new and improved hand tool handle assembly including a hand cushion grip covering a grip supporting portion of the handle, said grip covering being molded in place on the handle and securely affixed thereto.

Another object of the present invention is to provide a hand tool handle assembly of the type described having a molded grip encasing a hollow tubular handle closed at its butt end by a plastic plug driven into the open butt end to provide a press fit therewith, said plug being formed of polymeric material exhibiting dimensional stability at the elevated temperatures normally encountered in injection molding operations.

Still another object of the present invention is to provide a new and improved process for molding a hand cushion grip covering on the handle of a hand tool or the like.

A further object of the present invention is to provide a new and improved method of producing a molded grip covering for hand tool handles and the like which eliminates the presence of undesirable air pockets within the mold and an inordinate amount of flash, yet facilitates direct milding on the handle without the necessity for further finishing operations subsequent to the molding operation.

Other objects will be in part obvious and in part pointed out in more detail hereinafter.

These and related objects are accomplished in accordance with the present invention by providing a new and improved tubular handle for hand tools and the like comprising a grip supporting portion having a hollow open construction at the butt end thereof. A solid preformed plastic plug of material exhibiting dimensional stability at elevated temperatures is secured in the open butt end of the handle by a pressure fit therewith. The grip supporting portion of the handle is accurately positioned within a sealed mold cavity containing a multitude of perforation-producing pins having individual gas vents spaced along the longitudinal extent of the mold cavity. A hand cushion grip is then molded directly onto the handle conforming with and secured to the fully encased grip supporting portion and plastic plug.

A better understanding of the objects, advantages, features, properties and relationships of the invention will be obtained from the following detailed description and the accompanying drawing which set forth an illustrative embodiment and are indicative of the way in which the principles of the invention are employed.

BRIEF DESCRIPTION OF THE DRAWING

In the drawing:

FIG. 1 is an elevational view of a hand tool, partially broken away and partially in section, illustrating a tool handle made in accordance with the teaching of the present invention, the view including a schematic illustration of a portion of an injection mold used for applying a grip to the tool handle;

FIG. 2 is an enlarged view, partially broken away and partially in section, of the butt end of the handle of FIG. 1;

FIG. 3 is a further enlarged sectional view taken along the line 3—3 of FIG. 2 showing only the end plug of the handle;

FIG. 4 is a sectional view taken along the line 4—4 of FIG. 1 illustrating the construction of one of the mold's perforation core pin and socket assemblies utilized in the method of the present invention; and FIG. 5 is a sectional view taken along the line 5—5 of FIG. 4.

DESCRIPTION OF A PREFERRED EMBODIMENT

Referring now to the drawings in greater detail, wherein like reference numerals indicate like parts throughout the several figures, a hammer, generally designated 10, is shown with a handle 12 and a conventional striking head 14 including a poll and bell 16 and set of arcuate claws 18. The elongated generally cylindrical handle 12 is connected to the hammer head 14 at the central shank portion 20 thereof and extends outwardly therefrom, the point of intersection of the handle with the head being covered with a trim ring 22.

In the specific embodiment illustrated the handle 12 is a hollow tubular steel member exhibiting a circular cross-sectional configuration at the trim ring that progressively changes in the upper handle portion 24 to an elliptical cross-section configuration as it approaches the grip supporting portion thereof designated by the numeral 26. The handle 12 remains substantially unchanged in cross section along the full grip supporting portion 26 and terminates in a free edge 30 defining the hollow butt end thereof.

In accordance with the present invention the tubular butt end of the handle is enclosed by means of an end plug 34 consisting essentially of a tapered main body portion 36 and a radial lip or flange 38 extending outwardly from the enlarged end of the main body portion for cooperatively engaging the terminal or free edge 30 of the tubular handle. As best shown in FIGS. 2 and 3, the end plug 34 used to close the free or butt end of the tubular steel handle 12 is of generally elliptical configuration and the frustoconical main body portion 36 thereof tapers at an angle of about 5° along its major longitudinal extent. The innermost end of the plug 34 is chamfered with the dimension of the main body portion adjacent the chamfer being substantially equal to but slightly smaller than the interior elliptical dimension of the tubular steel handle. Thus, as a result of the taper the plug must be driven firmly into the interior of the tubular steel handle to provide a firm and secure press fit or heavy interference fit therewith capable of withstanding the pressure generated within the handle during the molding operation. As will be appreciated the lip 38 will limit the extent to which the plug body 36 is driven into the handle. In view of the smooth plastic surface of the preformed plug, it is frequently desirable to treat the interior of the tubular steel handle with a small amount of size before driving the plug into its final position thereby additionally assuring a firm interconnection between the two members.

In accordance with the present invention a contoured hand cushion covering 40 is molded in place over the grip supporting portion 26 of the handle so as to fully envelop that portion of the handle and completely enclose the end plug 34. A multiplicity of perforations 42 are provided along opposite sides of the grip, the perforations 42 extending into the grip for a distance substantially less than its total thickness and assisting in providing improved gripping action. In the embodiment illustrated the perforations are in the form of four substantially parallel rows of staggered perforations extending longitudinally along substantially the full length of the grip. In order to assure full adhesion of the molded grip 40 to the tubular grip supporting portion 26 of the handle, that portion is advantageously covered with a suitable adhesive 44 (FIG. 2) such as the adhesive sold under the designation "Goodyear 9071". In the preferred embodiment the adhesive is air cured for thirty minutes before molding the grip thereon. As will be appreciated the molded-in-place grip will conform to all irregularities in the grip supporting portion of the handle and thereby resist displacement of the grip on the handle under prolonged use.

The grip may be formed from suitable cushion forming material having good shock-absorbing properties such as the natural or synthetic elastomeric materials of rubber-like characteristics which may or may not include flocking. However, it has been found that consistently good results have been achieved by utilizing synthetic resins such as polyvinyl chloride as the principal component of the grip in conjunction with about 2 to 10% nylon flock and a suitable foaming agent. Such materials can be readily molded in place using an injection nozzle temperature of about 335° F.

As mentioned hereinbefore the utilization of temperatures above about 300° F during the molding operation necessitates the employment of an end plug material having the ability to withstand not only the temperatures encountered during the molding operation but also the temperatures thus encountered in combination with the increased pressure exerted by the heated air entrapped within the hollow tubular handle. In this connection polyphenylene oxide plastics cush as the 20% glass reinforced polyphenylene oxide sold by General Electric under the name "Noryl GFN2" have been found to give excellent results. However, it will be appreciated that other high temperature plastic materials exhibiting the requisite dimensional stability at the elevated temperatures and pressures developed within the hollow tubular handle may also be employed. The preferred polyphenylene oxide material generally possesses high strength and stiffness above 200° F, a heat deflection temperature of 290° F at 264 psi and a thermal coefficient of expansion of 0.000002 inch/inch/° F at −20° F to 150° F. Advantageously the preferred material also exhibits low creep and good impact resistance in addition to maintaining its desirable dimensional stability at elevated temperatures.

Although heretofore problems were encountered when attempts were made to mold the hand cushion grips on tubular handles, it has been found that the method employed in accordance with the present invention overcomes these problems and can also be utilized for molding grips on solid handles such as solid steel or fiberglass handles as well as on tubular handles. In accordance with the preferred technique, the hand tool is entirely assembled except for the molded grip portion and the head or other working portion of the tool is appropriately located by means of a suitable rest and stop arrangement such as that schematically illustrated at 46 in FIG. 1. As will be noted, a sealing arrangement is provided at the end of the grip supporting portion 26 of the handle closest to the hammer head. The seal consists of a high density or ultrahigh molecular weight polyethylene or similar sealing material which is carefully fitted into an appropriate notch or recess 48 at the innermost end of the mold cavity 50. The split seal 52 illustrated in FIG. 1 firmly contacts the elliptical exterior of the steel handle adjacent the upper end of handle portion 26 and prevents flow of the fluid molding composition longitudinally along the length of the handle beyond the mold cavity. The cavity 50 is connected by a suitable gate 54, runner 56 and sprue 58 with an appropriate injection nozzle (not shown) for feeding the fluid polyvinyl chloride plastic or other grip forming material to the mold cavity.

Each mold half or part, generally designated 60, is constructed so that conventional gas vents (not shown) are provided along the parting line between the mold parts and permit the escape of entrapped gas from the cavity as the fluid molding composition enters the cavity through the gate 56. In accordance with the present invention each mold part 60 is further provided with a plurality of core pin sockets 62 arranged in aligned spaced relationship along the length of the mold cavity. In the embodiment illustrated the core pin sockets 62 are arranged in four longitudinally extending rows or columns with the sockets in adjacent rows being staggered.

Referring to FIGS. 4 and 5, each socket 62 is of circular configuration and houses a perforation core pin 64 seated within the mold and extending into the cavity 50 a distance less than the thickness of the grip, such as a distance of approximately one-sixteenth inch. The perforation core pins 64, which in the embodiment illustrated may number as many as 166 on each mold half and have a diameter of about 0.046 inch, are spaced about 0.125 inch apart and advantageously are provided with longitudinal flats 66 along opposite sides thereof. The flats 66 are of a depth of only about 0.002 inch yet are of sufficient size to provide dual gas vents 68 along each core pin to facilitate the escape of gas entrapped within the mold cavity.

As best shown in FIG. 4 the core sockets are enlarged at a location spaced from the mold cavity 50 thereby permitting intercommunication between the vents 68 on opposite sides of the perforation core pin 64 and more rapid flow of the gas through the sockets. Generally V-shaped grooves or gas channels 72 are provided at the outer end of the core pins and further assist in venting the entrapped gas by providing intercommunication between the vents 66 and the enlarged vent passages 74 of the molding device. Since in the preferred embodiment over six hundred individual gas vents are arranged along the length of the mold cavity, a relatively large area is provided for gas escape despite the extremely small size of the individual vent passages used. This enlarged venting area permits more rapid operation of the injection molding device without the build-up of back pressure within the mold cavity. Additionally as a result of this arrangement a flash of greater than 0.005 inch is avoided in the finished product and the molded grips require no post molding operation in order to place them in a marketable condition.

As will be apparent to presons skilled in the art, various modifications, adaptations and variations of the foregoing specific disclosure can be made without departing from the teachings of the present invention.

We claim:

1. In an elongated tubular handle for hand tools and the like comprising a grip supporting portion having a hollow open construction at the free end thereof and a hand cushion grip covering the grip supporting portion and free end, the combination including a plug formed of a solid durable plastic material having dimensional stability at elevated temperatures driven into said open end in a secure press fit connection with said handle to fully close said free end, the hand cushion being molded in place over said plug to fully enclose the plug and conformably adhere to the grip supporting portion of the handle.

2. The tool handle of claim 1 wherein the plug omprises a generally arcuate body portion having an integral radially extending flange on one end thereof, said main body portion being positioned within the tubular handle in press fit relationship therewith and the radial flange cooperatively engaging the end of the handle to limit inward movement of the plug.

3. The tool handle of claim 2 wherein the tubular handle and plug are of elliptical cross section and the body portion of the plug is provided with tapered outer walls of greater circumference along a portion of its length prior to insertion within said handle than the internal circumference of the tubular handle.

4. The tool handle of claim 1 including a layer of adhesive between the grip and the grip supporting portion of the handle for firmly anchoring the grip to the handle.

5. The tool handle of claim 1 wherein the molded-in-place grip is provided with a multiplicity of grip facilitating perforations spaced along the length of the grip and extending into the grip for a depth less than the thickness thereof.

6. The tool handle of claim 1 wherein the plug is formed of a polyphenylene oxide resin composition.

* * * * *